United States Patent [19]

De Bruijn

[11] Patent Number: 4,673,068

[45] Date of Patent: Jun. 16, 1987

[54] HYDRAULIC TWIN-PIPE SHOCK ABSORBER

[75] Inventor: Alexis M. R. De Bruijn, Oud-Beijerland, Netherlands

[73] Assignee: Koni B. V., Oud-Beijerland, Netherlands

[21] Appl. No.: 819,895

[22] Filed: Jan. 16, 1986

[30] Foreign Application Priority Data

Jan. 21, 1985 [NL] Netherlands ............. 8500145

[51] Int. Cl.[4] ................................ F16F 9/40
[52] U.S. Cl. .................... 188/315; 188/318; 188/322.11
[58] Field of Search ........... 188/315, 317, 318, 320, 188/322.11, 322.12, 322.13, 322.14, 311.15, 322.16, 322.17, 322.19, 322.21, 322.22

[56] References Cited

U.S. PATENT DOCUMENTS

| | | | |
|---|---|---|---|
| 1,409,287 | 3/1922 | Eidmann | 188/317 |
| 3,205,789 | 9/1965 | Mandelko | 188/317 X |
| 3,661,236 | 5/1972 | Wossner | 188/322.17 X |
| 4,440,273 | 4/1984 | Butler | 188/315 |

FOREIGN PATENT DOCUMENTS 1292014  4/1969  Fed. Rep. of Germany ...... 188/315

*Primary Examiner*—Andres Kashnikow
*Assistant Examiner*—Richard R. Diefendorf
*Attorney, Agent, or Firm*—James B. Raden; William J. Michals

[57] ABSTRACT

A hydraulic twin-pipe shock absorber for horizontal use and which is particularly suitable for use with rail vehicles. The shock absorber includes a cylindrical housing with a fluid-filled working cylinder provided inside the housing. A piston is displaceable in the working cylinder and is connected to a clearance between the housing and the working cylinder. The construction of the shock absorber removes air and foam from the working cylinder so that pressure builds up evenly and uniformly.

1 Claim, 2 Drawing Figures

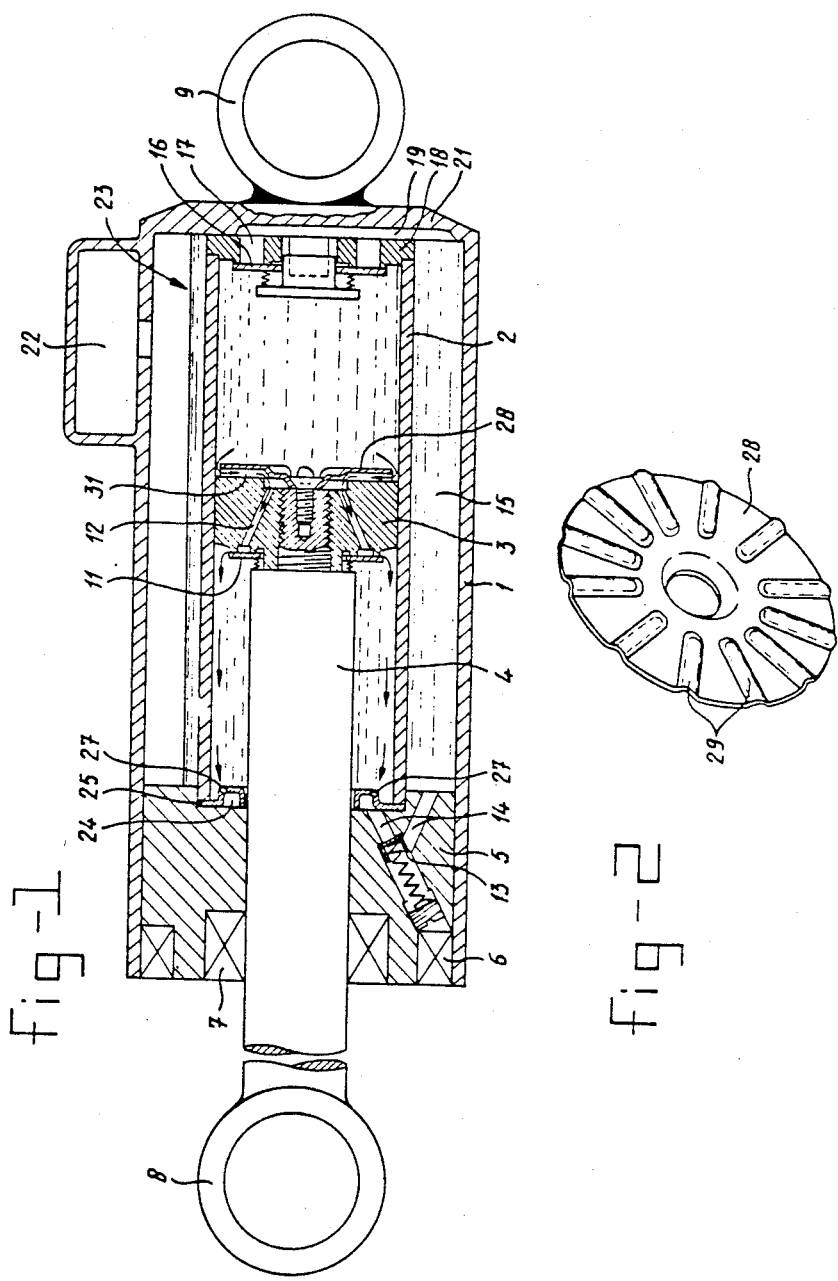

HYDRAULIC TWIN-PIPE SHOCK ABSORBER

BACKGROUND OF THE INVENTION

This invention relates to a hydraulic twin-pipe shock absorber for horizontal use, in particular for rail vehicles provided with a cylindrical housing, a fluid-filled working cylinder provided inside the housing, and a radial clearance between the housing and working cylinder. A piston is displaceable in the working cylinder and has a first connection which is located between the clearances on either side of the piston and can be shut-off by a first non-return value. A piston rod projects through a cover of the working cylinder. A second connection extends through the cover between the working cylinder and the radial clearance and can be shut-off by a second shut-off valve. A third connection is located between the radial clearance and the working cylinder clearance not containing the piston rod and can be shut-off by a third shut-off valve. The first non-return valve admits hydraulic fluid to the working cylinder part with the piston rod, the second non-return valve admits hydraulic fluid to the radial clearance, and the third non-return valve admits hydraulic fluid to the working cylinder part without the piston rod.

The hydraulic fluid can flow in only one direction through the working cylinder, namely from the working cylinder clearance without the cylinder rod passage to the working cylinder clearance with the cylinder rod passage, and from the latter clearance to the radial clearance. Such a circulating design means that the resistance during movement of the piston rod in two opposing directions can be essentially equal, which with the use of a horizontal absorber in a rail vehicle is of vital importance for satisfactory bend behavior.

The non-return valves are loaded in the closing direction by a spring, this means that before a valve can be opened by the hydraulic fluid, pressure must be built up. If there is air in the working cylinder, the pressure build-up will be uneven, which means that the first and second non-return valves do not always open in the same conditions and the resistance effect can be uneven. Air and possibly foam could also delay the moment of opening of the non-return valves. The air and the foam collect in the horizontal cylinder at the top against the cover which allows through the piston rod and against the piston. Dead spaces filled with the air or the foam are produced as a result. The object of the invention is to solve the problem of upsetting the uniformity of the action at the first connection.

SUMMARY OF THE INVENTION

According to the invention, the shock absorber is characterized in that fixed against the piston is a disc with a number of uniformly distributed protuberances extending radially, and with the surface of the piston bounding narrow radial channels which with their circumferential ends debouch in the working cylinder clearance, and with their inside ends are connected to channels in the piston.

On inward movement of the piston, the hydraulic fluid is passed through the radial channels and the limited passage of the channels leads to a pressure drop which causes acceleration of the hydraulic fluid, with the result that any air and foam present are carried along through the radial channels debouching in the top part of the working cylinder. Air and foam pass by way of the first non-return valve into the working cylinder clearance with passage of the piston rod.

The problem of upsetting the uniformity of the action is also very important for the second connection between the working cylinder and the radial clearance because the non-return valve in this second connection is opened on the movement of the piston in the two opposite directions, and the spring pressure of the second non-return valve in particular, is thereby important for the shock absorption.

Therefore, a practical design of the principle of the invention is further characterized in that positioned between the cover and the working cylinder clearance around the piston rod is an annular aeration channel into which debouches a pipe with the second non-return valve, while disposed in the boundary wall of said annular aeration channel facing said working cylinder clearance are a number of regularly distributed bores acting as a narrowing part.

There are one or more bores in the top part of the working cylinder clearance. The second non-return valve may be located at any desired place relative to the top side which simplifies the fitting of a cover with screw thread. By means of the non-return valve the hydraulic fluid with any air or foam present is conveyed to the radial clearance around the working cylinder. The air can separate off and collect in said radial clearance.

BRIEF DESCRIPTION OF THE DRAWING

The invention will not be explained in greater detail with reference to the accompanying drawing wherein:

FIG. 1 shows a longitudinal section of a hydraulic twin-pipe shock absorber for horizontal use according to the invention; and, FIG. 2 shows a view of the disc to be fitted against the piston;

DETAILED DESCRIPTION

The twin-pipe shock absorber illustrated is intended for use in an approximately horizontal position, in particular between the body and the bogie of a rail vehicle. The idea is to absorb slight oscillations of the bogies which arise during travel at high speeds over straight stretches.

The absorber comprises a cylindrical housing 1, a working cylinder 2 disposed inside the housing, a piston 3 which is displaceable within the cylinder and is attached to a piston rod 4, which passes through a cover 5 fixed in the housing. Disposed between the cover and the housing and the piston rod are seals 6 and 7. The piston rod 4 is intended for connection to the body at 8, while the housing 1 should be connected to a bogie at 9. The working cylinder 2 and part of the housing 1 are filled with hydraulic fluid.

When the body moves relative to the bogie, the piston will be displaced in the working cylinder in which case the shock absorption is produced through the resistance which the hydraulic fluid meets with on passing non-return valves and narrowing parts.

A first non-return valve 11 is provided at the outlet side of channels 12 which are recessed in the piston 3. The valve consists of a spring-loaded ring and can open in only one direction from the working cylinder clearance without piston rod passage to the working cylinder clearance with piston rod passage. The direction of flow of the hydraulic medium is indicated by arrows.

A second non-return valve 13 is fitted in a connection channel 14 which is recessed in the cylindrical cover 5 and forms the connection between the working cylinder clearance with piston rod passage and the radial clearance 15 between the jacket of the working cylinder 2 and the jacket of the housng 1. The valve 13 only allows fluid through in the direction of the radial clearance 15. This clearance 15 forms a reservoir to compensate for volume differences as a result of penetration to a greater or lesser extent of the piston rod into the working cylinder.

A third non-return valve 16, in the form of a spring-loaded ring, is located in front of the channels 17 which are recessed in the bottom cover 18 of the working cylinder 2 and which are connected with the radial clearance 15 by means of a recess 19 in the bottom 21 of the housing 1. The valve 16 only allows fluid through in the direction from the radial clearance 15 to the working cylinder clearance without piston rod passage.

An additional air chamber 22 is built on to the housing in order to increase the air volume of the housing. The level of the fluid in the housing is indicated by 23.

The channel 14 is recessed in the cover 5, debouches at the side of the working cylinder 2 in an annular channel 24, formed by a U-shaped recess in a metal ring 25, which is positioned round the piston rod 4 and is clamped by the edge of the jacket of the working cylinder 2 against the cover 5. Narrow bores 27 are provided at regular intervals in the U-shaped recess.

A metal disc 28 is fitted against the piston 3 at the side of the working cylinder clearance without piston rod passage. This disc is provided with protuberances 29 which extend radially inwards from the peripheral edge of the disc and in the fitted state of the disc debouch in a central cover recess 31 which is connected to the channels 12. Between the peripheral edge of the disc and the jacket of the working cylinder 2 is a feed slot for hydraulic fluid.

The absorber of the present invention functions as follows:

If the piston rod moves to the left, the hydraulic fluid will be displaced into the radial clearance 15 by way of the bore 27, the annular channel 24, the channel 14, and the non-return valve 13 opened by pressure. Over the narrow bores 27, a pressure drop occurs and the hydraulic fluid is accelerated in the bores. This acceleration causes any air and foam which may have collected in the top left-hand side of the working cylinder clearance with piston rod passage to be carried along and discharged from the working cylinder.

Through the enlargement of the working cylinder clearance without piston rod passage, a partial vacuum is produced permitting fluid to flow from the radial clearance 15 by way of the recess 19, the channels 17, and the open non-return valve 16 into the working cylinder.

If the piston 3 moves to the right, fluid will flow from the working cylinder clearance without piston rod passage by way of the channels formed between the protuberances 29 and the piston, the central recess 31, the channels 12, and non-return valve 11 into the working chamber clearance with piston rod passage, and part of the volume of fluid reaching that working cylinder clearance with piston rod passage will flow by way of the above-mentioned route 27, 24, 14, 13 into the radial clearance 15; for on displacement of the piston, more fluid will be displaced in or out of the working cylinder clearance without piston rod passage than in or out of the one with piston rod passage.

Air and foam which may have collected against the disc at the top of the working cylinder clearance without piston rod passage will be carried along through the narrow radial channels of the disc 28 due to a pressure drop building up over these radial channels and the fluid being accelerated in the channels.

The shock absorption is produced by the resistance which the fluid meets with when passing non-return valves, channels, and narrowing parts. The shock absorption should be uniform during movements of said piston to right and left. This uniformity is promoted, on the one hand, in a known manner, by the circulation in one direction of the hydraulic fluid (all valves opening in the same direction of flow and the liquid passing the non-return valve 13 in the case of both piston movements) and, on the other hand, according to the invention, by the air and foam being carried along due to the accelerated passage through narrowing channels.

Air and foam, if not discharged, would have a delaying effect on the opening and closing of the valves which would hamper the shock absorption. Of course, various modifications of the absorber illustrated and described herein are possible within the scope of the present invention.

What is claimed is:

1. A hydraulic twin-pipe shock absorber for horizontal use, which is particularly suitable for rail vehicles, said shock absorber being provided with a cylindrical housing, a fluid-filled working cylinder provided inside said housing, a radial clearance between said housing and said working cylinder, a piston which is displaceable in said working cylinder and has a first connection which is located between piston clearances on either side of the piston and can be shut-off by a first non-return valve, a piston rod projecting through a cover of the working cylinder, a second connection which extends through said cover between the working cylinder and said radial clearance and can be shut-off by a first shut-off valve, and a third connection which is located between said radial clearance and the working cylinder clearance not containing the piston rod and can be shut-off by a second shut-off valve, wherein said first non-return valve admits hydraulic fluid to a working cylinder part with the piston rod, said first shut-off valve admits hydraulic fluid to the radial clearance, and said second shut-off valve admits hydraulic fluid to said working cylinder clearance without the piston rod, wherein a disc (28) is fixed against the piston (3) with a number of uniformly distributed protuberances (29) extending radially and with a surface of the piston bounding narrow radial channels defining circumferential ends which debouch in said working cylinder clearance and wherein the inside ends of said narrow channels are connected to channels (12) in the piston, wherein an annular foam venting channel (24) is positioned between said cover (5) and the clearance around the piston rod (4) into which debouches a pipe (14) with said first shut-off valve (13), while disposed in a boundary wall of said annular foam venting channel, facing said working cylinder clearance, a number of regularly distributed narrow pressure reducing bores (27) are provided.

* * * * *